United States Patent
Sato et al.

(10) Patent No.: US 10,790,496 B2
(45) Date of Patent: Sep. 29, 2020

(54) BATTERY WIRING MODULE INCLUDING A COVER FOR AN INTERCONNECTING PORTION

(71) Applicant: SUMITOMO WIRING SYSTEMS, LTD., Mie (JP)

(72) Inventors: Hiroshi Sato, Mie (JP); Ryota Mori, Mie (JP); Hisayoshi Yaita, Mie (JP); Masami Suzuki, Mie (JP); Kenta Sawai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/540,523

(22) Filed: Aug. 14, 2019

(65) Prior Publication Data
US 2020/0075922 A1    Mar. 5, 2020

(30) Foreign Application Priority Data
Aug. 29, 2018 (JP) .................. 2018-160512

(51) Int. Cl.
| | |
|---|---|
| *H01M 2/30* | (2006.01) |
| *H01R 25/16* | (2006.01) |
| *H01M 2/20* | (2006.01) |
| *H01R 13/533* | (2006.01) |
| *H01R 13/52* | (2006.01) |
| *H01R 13/50* | (2006.01) |

(52) U.S. Cl.
CPC ............. *H01M 2/30* (2013.01); *H01M 2/206* (2013.01); *H01R 25/162* (2013.01); *H01R 13/501* (2013.01); *H01R 13/5213* (2013.01); *H01R 13/533* (2013.01)

(58) Field of Classification Search
CPC . H01R 13/533; H01R 13/5213; H01R 13/501
See application file for complete search history.

(56) References Cited

U.S. PATENT DOCUMENTS

| | | | |
|---|---|---|---|
| 8,436,247 B2 * | 5/2013 | Mase ....................... | H01R 4/34 174/135 |
| 2014/0158396 A1 | 6/2014 | Nakayama | |

FOREIGN PATENT DOCUMENTS

JP        2013-037988        2/2013

* cited by examiner

*Primary Examiner* — Tho D Ta
(74) *Attorney, Agent, or Firm* — Greenblum & Bernstein, P.L.C.

(57) ABSTRACT

Provided is a battery wiring module that can suppress the occurrence of short circuits. The battery wiring module includes a module-side terminal that is configured to be electrically connected to a bus bar that connects battery terminals of a plurality of battery cells to each other, a wire having one end that is configured to be connected to the module-side terminal, and a housing that is configured to house the wire and the module-side terminal. The housing includes a terminal housing portion that is configured to house the module-side terminal, and a hole portion that is provided on a bottom portion of the terminal housing portion and interconnects an interior region and an exterior region of the terminal housing portion. The battery wiring module further includes a cover portion that has an insulating property and is configured to cover the hole portion.

12 Claims, 3 Drawing Sheets

BATTERY WIRING MODULE INCLUDING A COVER FOR AN INTERCONNECTING PORTION

TECHNICAL FIELD

The present invention relates to a battery wiring module.

BACKGROUND ART

JP 2013-37988A discloses a battery wiring module that is attached to a high-voltage secondary battery installed in a vehicle, such as an electric automobile or a hybrid automobile, as a power source for driving the vehicle when the vehicle is traveling. The battery wiring module has module-side terminals that are connected to bus bars (connection members in JP 2013-37988A) that connect a plurality of battery cells to each other, with these connected battery cells constituting the secondary battery.

JP 2013-37988A is an example of related art.

SUMMARY OF THE INVENTION

Problem to be Solved by Invention

With the battery wiring module, it is conceivable that an interconnecting portion such as a hole or a notch will be formed in a housing portion, which houses the module-side terminals, due to aspects of the mold that is used. In this case, if the interconnecting portion is open on the battery cell side or the bus bar side, there is concern that short circuits could occur inadvertently between the module-side terminals and bus bars (battery cells) other than the bus bars (battery cells) that are connected to the module-side terminals.

The present invention was made for the purpose of resolving the problems described above, and an objective thereof is to provide a battery wiring module that can suppress the occurrence of short circuits.

Means to Solve the Problem

A battery wiring module that solves the above-described problem includes a module-side terminal that is configured to be electrically connected to a bus bar that connects battery terminals of a plurality of battery cells to each other, a wire having one end that is configured to be connected to the module-side terminal, and a housing that is configured to house the wire and the module-side terminal, wherein the housing includes a terminal housing portion configured to house the module-side terminal, and an interconnecting portion that is provided on a bottom portion of the terminal housing portion and interconnects an interior region and an exterior region of the terminal housing portion, and the battery wiring module further includes a cover portion that has an insulating property and is configured to cover the interconnecting portion.

With the mode described above, the interconnecting portion is covered by the cover portion having an insulating property, and therefore the occurrence of short circuits via the interconnecting portion can be suppressed.

It is preferable that, in the battery wiring module described above, the housing includes a lock portion configured to restrict movement of the module-side terminal in the terminal housing portion, and the interconnecting portion that is formed at a position corresponding to the lock portion.

With the mode described above, even if there is an interconnecting portion, or more specifically, an interconnecting portion created through injection molding or the like, formed at a position corresponding to the lock portion, the interconnecting portion is covered by the cover portion, and therefore the inadvertent occurrence of short circuits can be suppressed.

It is preferable that, in the battery wiring module described above, the lock portion and the interconnecting portion are arranged at positions that overlap with a battery cell that is adjacent to a battery cell that is connected, via a bus bar, to the module-side terminal that is restricted by the lock portion from moving in a direction in which the housing and the battery cells are stacked.

With the mode described above, even if the module-side terminal is arranged at a position that overlaps with the adjoining battery cell, the cover portion covers the interconnecting portion as described above, and therefore the occurrence of short circuits between the module-side terminal and the neighboring battery cell (or bus bar connected to the neighboring battery cell) via the interconnecting portion can be suppressed.

It is preferable that, in the battery wiring module described above, the cover portion is formed as a single piece with the housing.

With the mode described above, an increase in the number of components can be suppressed because the cover and the housing are formed as a single piece.

It is preferable that, in the battery wiring module described above, the cover portion is integrally connected to the housing by a hinge portion.

With the mode described above, the housing and the cover portion are integrally connected by the hinge portion, and therefore the cover portion can be attached to the housing in such a way that the cover portion covers the interconnecting portion.

It is preferable that, in the battery wiring module described above, the cover portion includes a latch portion that keeps the cover portion in a state of covering the interconnecting portion.

With the mode described above, the occurrence of short circuits can be further suppressed because the interconnecting portion can be kept in a state of being covered by the cover portion with use of the latch portion of the cover portion.

Effect of the Invention

The battery wiring module of the present invention can suppress the occurrence of short circuits.

EMBODIMENTS OF THE INVENTION

Figure 1:
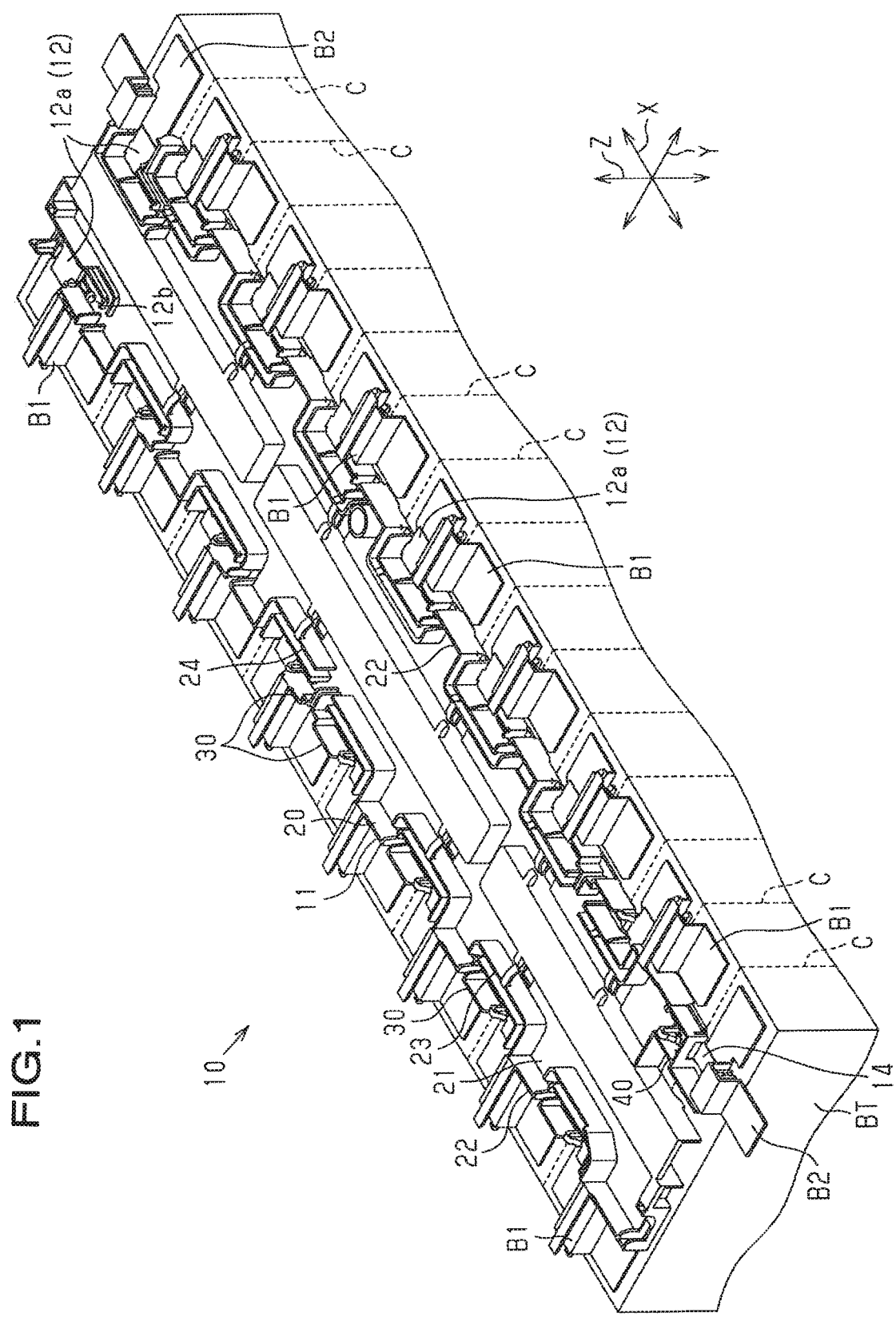
FIG. 1 is a perspective view of a battery wiring module in an embodiment.

The following describes an embodiment of a battery wiring module. Note that parts of the configuration may be exaggerated or simplified in the drawings for the convenience of description. Also, the dimensional ratios of the parts shown in the drawings may differ from those of the actual parts.

As shown in FIG. 1, a battery wiring module 10 is attached to an upper surface of a secondary battery BT that has a substantially rectangular parallelepiped shape. Note that the secondary battery BT is for installation in an electric automobile, a hybrid automobile, or the like, and supplies power to a traveling motor of a vehicle. Also, the secondary battery BT receives power supplied from the traveling motor, a power generating motor, or the like, according to the charging state of the secondary battery BT, the operational state of the vehicle, or the like. The following description uses the three directions shown in FIG. 1 that are orthogonal to each other, namely directions X, Y, and Z, with the X direction being the direction in which the battery cells are lined up, the Y direction being the width direction of the battery wiring module, and the Z direction being the up-down direction.

The secondary battery BT includes a plurality of battery cells C that have positive electrode terminals and negative electrode terminals (neither shown) that face the battery wiring module 10 side (upper side).

The battery cells C are arranged such that they are lined up, in plurality, in the X direction. The battery cells C are lined up such that the positive electrode terminals and the negative electrode terminals, which are battery terminals, alternate in the direction in which the battery cells C are lined up, that is, in the X direction. The terminals are provided with bus bars B1 and B2 that connect adjacent terminals to each other, that is, connect the positive electrode terminals and the negative electrode terminals to each other. In other words, the battery cells C are connected in series by the bus bars B1 and B2. The bus bars B1 and B2 in the present example may be connected to the positive electrode terminals and the negative electrode terminals of the battery cells C through welding, for example.

A housing 11 is constituted by a resin member, for example. The housing 11 includes a wire housing portion 20 that houses a wire 13, and terminal housing portions 30 and 40 that house module-side terminals 12 and 14.

Figure 2:
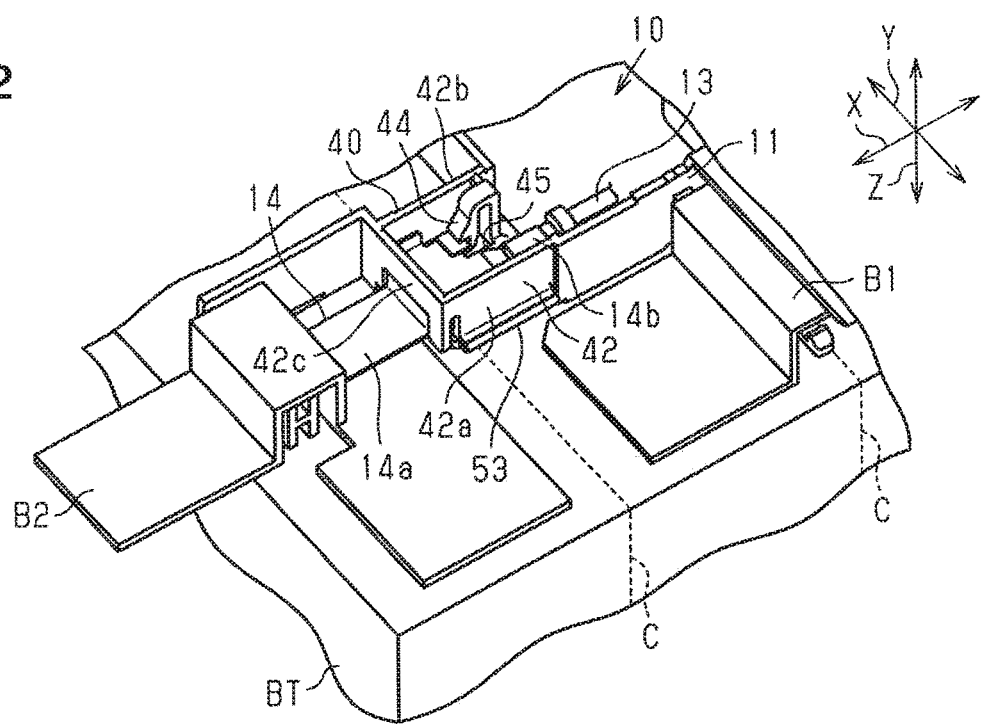
FIG. 2 is a perspective view showing a part of the battery wiring module in the embodiment.

As shown in FIGS. 1 and 2, the module-side terminals 12 and 14 include plate-shaped terminal bodies 12a and 14a, and substantially cylindrical barrel portions 12b and 14b that are continuous with the terminal bodies 12a and 14a. The barrel portions 12b and 14b are electrically connected to the core of the wire 13. Also, the module-side terminal 12 of the present example is configured such that the terminal body 12a sticks out in the Y direction relative to the X direction, which is the lengthwise direction of the substantially cylindrical barrel portion 12b, and is approximately shaped like the letter "L". The module-side terminal 14 is provided at an end portion of the battery wiring module 10 in the X direction, and has a straight shape in which the terminal body 14a and the barrel portion 14b are continuous in the X direction, which is the lengthwise direction of the barrel portion 14b. This module-side terminal 14 is connected to one of the bus bars B2, which are used for power extraction and are provided at both ends of the battery wiring module 10 in the X direction. The bus bars B2 for power extraction are connected to the positive electrode terminals or the negative electrode terminals of the battery cells C that are positioned at the ends of the battery wiring module 10 in the X direction. Specifically, the bus bar B2 on one side of the battery wiring module 10 in the X direction is connected to the positive electrode terminal of the battery cell C that is provided closest to said bus bar B2, and the bus bar B2 on the other side of the battery wiring module 10 in the X direction is connected to the negative electrode terminal of the battery cell C that is provided closest to said bus bar B2. Note that the bus bars B2 are approximately shaped like the letter "L" when viewed in the Z direction, and one end of each of the bus bars B2 sticks out in the X direction.

As shown in FIG. 1, the wire housing portion 20 of the housing 11 is defined in the housing 11 by a bottom portion 21 and a side wall 22 that extends from the outer edge portion of the bottom portion 21. The wire housing portion 20 includes a plurality of recessed portions 23 and 24 in the direction in which the plurality of battery cells C are lined up, and the plurality of recessed portions 23 and 24 are recessed in a direction that is orthogonal to the direction in which the housing 11 is stacked on the battery cells C, and is orthogonal to the direction in which the plurality of battery cells C are lined up, or in other words, the recessed portions 23 and 24 are recessed in the widthwise Y direction. Each recessed portion 23 is provided with one terminal housing portion 30. The recessed portion 24 is provided with two housing portions 30.

As shown in FIG. 1, the terminal housing portions 30 of the housing 11 that are housed in the recessed portions 23 and 24 have substantially rectangular parallelepiped shapes and are elongated in the X direction.

As shown in FIGS. 1 to 5, the terminal housing portion 40 that houses the module-side terminal 14 that is positioned at an end of the battery wiring module 10 in the X direction includes, similarly to the housing portion 30, a bottom portion 41 and a side wall 42 that extends from the outer edge portion of the bottom portion 41.

The side wall 42 includes a first wall portion 42a, a second wall portion 42b, and a third wall portion 42c.

The first wall portion 42a and the second wall portion 42b oppose each other in the Y direction. The third wall portion 42c faces the X direction and connects the first wall portion 42a and the second wall portion 42b. An open portion 43 is formed between the third wall portion 42c and the bottom portion 41, and a part of the terminal body 14a of the module-side terminal 14 is exposed to the outside of the housing 11 through this open portion 43.

The terminal housing portion 40 that houses the module-side terminal 14 that is positioned at an end of the battery wiring module 10 in the X direction includes a lock portion 44 that restricts the module-side terminal 14 from moving in the Z direction. The lock portion 44 is able to come into contact with the module-side terminal 14 in the Z direction, and restricts the module-side terminal 14 from moving. Here, the housing 11 that includes the terminal housing portion 40 may be formed through injection molding, for example. For this reason, when the lock portion 44 is formed, a hole portion 45 is formed as an extraction hole at a position that corresponds to the lock portion 44, in consideration of the direction of extraction from the mold during the mold opening process. In the present example, the hole portion 45 is an interconnecting portion and is formed in the bottom portion 41 of the terminal housing portion 40, at a position opposing the lock portion 44 in the Z direction. The inside and outside of the terminal housing portion 40 are interconnected by the hole portion 45.

The lock portion 44 is separated, in the Y direction, from the bus bar of the adjoining cell in the terminal housing portion 40, and the hole portion 45 is separated from the bus bar B1 of the adjoining battery cell C.

The bottom portion 41 includes a cover portion 50 that covers the hole portion 45.

The cover portion 50 includes a substantially rectangular plate shaped cover main body portion 51, and a latch portion 52. The cover portion 50 is formed as a single piece with the terminal housing portion 40, that is to say, is configured as a single piece with the housing 11. The cover portion 50 is able to cover an underside surface 41a side of the bottom portion 41 of the terminal housing portion 40 with use of a hinge portion 53 that is provided close to the bottom portion 41 of the first wall portion 42a of the terminal housing portion 40. Note that the hinge portion 53 is formed as a single piece with both the terminal housing portion 40 and the cover portion 50, and is a flexible part that is thinner than the plate thickness of both the first wall portion 42a of the terminal housing portion 40, and the cover main body portion 51. The cover portion 50 is able to rotate about the hinge portion 53 (the rotational axis extending in the X direction) between an open position as shown in FIG. 4 and a closed position in which the cover portion 50 covers the hole portion 45.

Figure 3:
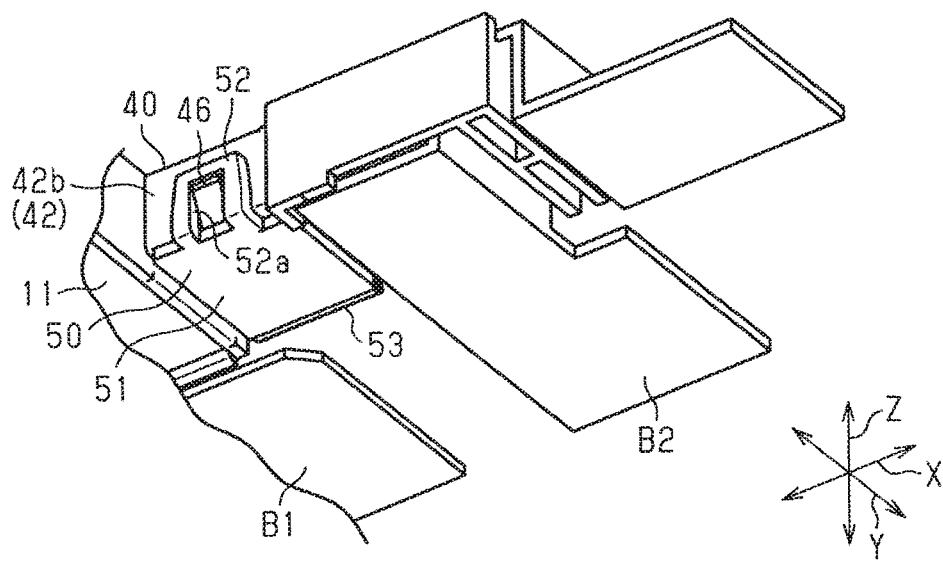
FIG. 3 is a perspective view showing a part of the lower surface side of the battery wiring module in the embodiment.
Figure 4:
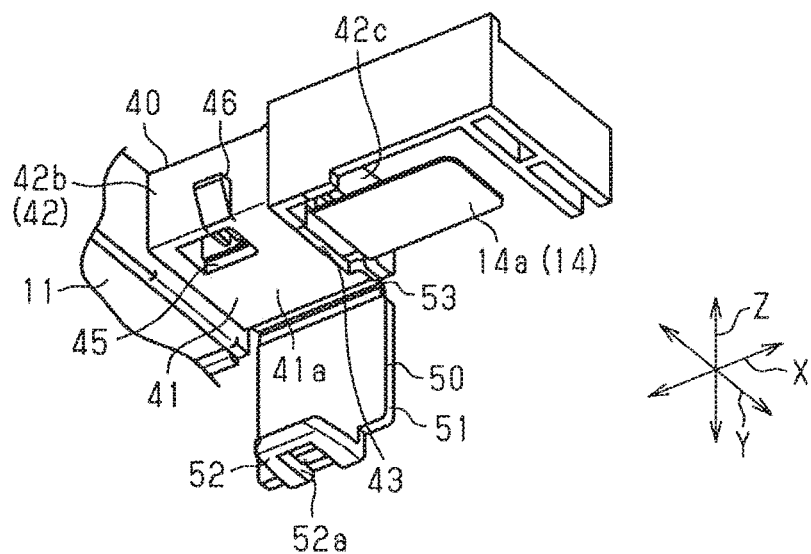
FIG. 4 is a perspective view showing a part of the lower surface side of the battery wiring module in the embodiment.
Figure 5:
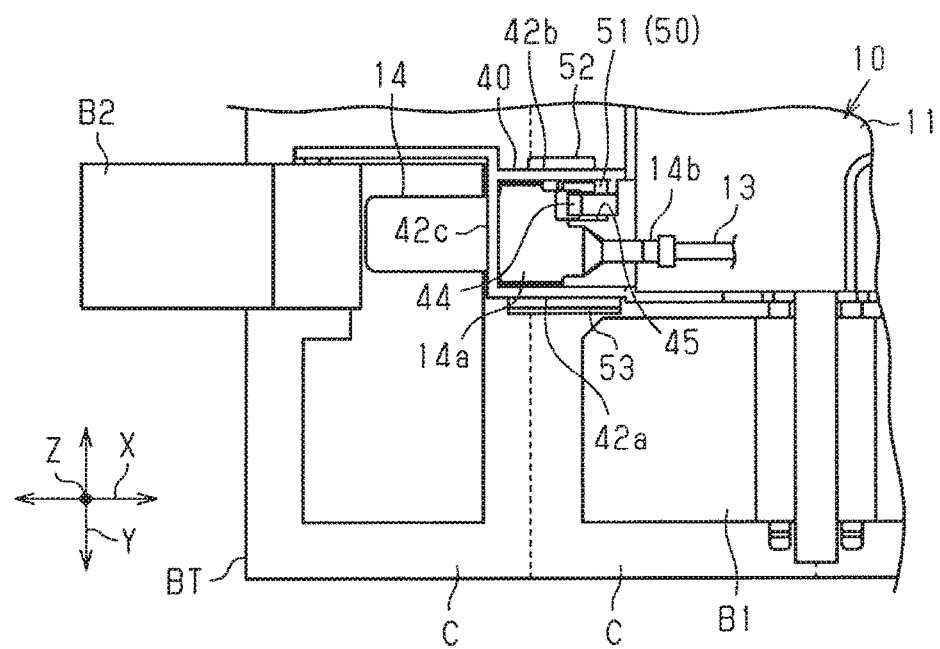
FIG. 5 is a plan view showing a part of the battery wiring module in the embodiment.

As shown in FIGS. 3 and 4, the latch portion 52 is provided on the leading end edge (the edge on the opposite side to the hinge portion 53) of the cover main body portion 51. The latch portion 52 is substantially shaped like the letter "U" and includes an engagement hole 52a in the center thereof, and is able to engage with a protrusion 46 that is formed close to the bottom portion 41 of the second wall portion 42b. Thus, it is possible to keep the cover portion 50 closed, that is to say, keep the hole portion 45 covered.

The following describes the actions of the present embodiment.

The battery wiring module 10 of the present embodiment is arranged on top of the secondary battery BT that includes the plurality of battery cells C. The module-side terminals 12 and 14 of the battery wiring module 10 are connected to the bus bars B1 and B2 that connect the positive electrode terminals and the negative electrode terminals of the battery cells C that are lined up in the X direction. One end of the wire 13 is connected to the module-side terminal 12, and the other end of the wire 13 is connected to a battery monitoring ECU (not shown). The battery monitoring ECU is able to monitor the voltage of the battery cells C.

Also, the housing 11 of the battery wiring module 10 includes the cover portion 50 that covers the hole portion 45 that is formed in the bottom portion 41 of the terminal housing portion 40. Here, the terminal housing portion 40 of the present example is arranged such that the portion thereof that includes the hole portion 45 overlaps, in the Z direction, with the adjoining battery cell C that is not the battery cell C that is connected to the module-side terminal 14 housed in the terminal housing portion 40. For this reason, if the module-side terminal 14 is arranged in the terminal housing portion 40 (the bottom portion 41) for example, the module-side terminal 14 and the adjoining battery cell C oppose each other via the hole portion 45. Here, if the module-side terminal 14 is connected to the positive electrode terminal of a regular battery cell C for example, the negative electrode terminal of the adjoining battery cell C that has a different polarity from the positive electrode terminal of the regular battery cell C will be at a position that is comparatively close to the module-side terminal 14. Through this, the bus bar B1 that is connected to the terminal of the adjoining battery cell C and the module-side terminal 14 are naturally at positions that are comparatively close. In other words, when the hole portion 45 is uncovered, a short circuit could occur between the module-side terminal 14 and the adjoining battery cell C (the bus bar B1) via the hole portion 45. There, as previously described, the hole portion 45 is covered by the cover portion 50 having an insulating property, and therefore the occurrence of short circuits is suppressed between the module-side terminal 14, which is housed in the terminal housing portion 40, and the adjoining battery cell C (the bus bar B1).

The following describes effects of the present embodiment.

(1) The hole portion 45 is an interconnecting portion and is covered by the cover portion 50 having an insulating property, and therefore the occurrence of short circuits via the hole portion 45 can be suppressed.

(2) Even if the hole portion 45, that is to say the hole portion 45 created through injection molding, is formed at a position corresponding to the lock portion 44, the hole portion 45 is covered by the cover portion 50, and thus the inadvertent occurrence of short circuits can be suppressed.

(3) The hole portion 45 is covered by the cover portion 50 as described above even if the module-side terminal 14 is arranged at a position that overlaps with the adjoining battery cell C, and therefore the occurrence of short circuits between the module-side terminal 14 and the adjoining battery cell C (or bus bar B1 connected to the adjoining battery cell C) via the hole portion 45 can be suppressed.

(4) The cover portion 50 and the housing 11 are formed as a single piece, and therefore an increase in the number of components is suppressed.

(5) The housing 11 and the cover portion 50 are integrally connected by the hinge portion 53, and therefore it is possible to attach the cover portion 50 to the housing 11 such that the cover portion 50 covers the hole portion 45.

(6) It is possible to keep the hole portion 45 covered by using the latch portion 52 of the cover portion 50, and therefore the occurrence of short circuits can be further suppressed.

(7) The lock portion 44 and the hole portion 45 are formed at positions that are separated in the Y direction from the adjoining battery cell C and the bus bar B1 that is connected to the adjoining battery cell C, in the terminal housing portion 40.

Note that the above-described embodiment can be modified and implemented as described below. The embodiment described above and the following variations can be combined and implemented as long as no technical contradictions arise.

In the embodiment described above, the lock portion 44 and the hole portion 45 are formed at positions that are separated in the Y direction from the adjoining battery cell C and the bus bar B1 that is connected to the adjoining battery cell C, in the terminal housing portion 40, but these positions in the terminal housing portion 40 may be changed as appropriate.

In the embodiment described above, the latch portion 52 of the cover portion 50 is substantially shaped like the letter "U", and is configured such that a protrusion 46 engages with an engagement hole 52a of the latch portion 52, but there is no limitation thereto. Changes can be made appropriately as long as the hole portion 45 can be kept covered by the cover portion 50.

In the embodiment described above, the cover portion 50 is integrally connected to the housing 11 by the hinge portion 53, but there is no limitation thereto, and a configuration is also possible in which the cover portion and the housing are separate.

In the embodiment described above, the hole portion 45 is described as corresponding to the lock portion 44, but a configuration is also possible in which another hole portion can be covered by a cover portion in a similar way. Also, configurations are also possible in which something other than a hole portion, such as notch, is the interconnecting portion.

LIST OF REFERENCE NUMERALS

10 Battery wiring module
11 Housing
12, 14 Module-side terminal
13 Wire
40 Terminal housing portion
44 Lock portion
45 Hole portion (interconnecting portion)
50 Cover portion
52 Latch portion
53 Hinge portion
B1, B2 Bus bar
C Battery cell

What is claimed is:

1. A battery wiring module comprising:
a module-side terminal that is configured to be electrically connected to a bus bar that connects battery terminals of a plurality of battery cells to each other,
a wire having one end that is configured to be connected to the module-side terminal, and
a housing that is configured to house the wire and the module-side terminal, wherein
the housing includes a terminal housing portion that is configured to house the module-side terminal, the terminal housing portion including a bottom portion that includes an underside surface that extends underneath the module-side terminal,
the housing includes an interconnection structure that is provided on the bottom portion of the terminal housing portion and that provides an opening through the underside surface so that the interconnection structure interconnects an interior region and an exterior region of the terminal housing portion, and
the battery wiring module further comprises a cover portion that has an insulating property and is configured to cover the interconnection structure.

2. The battery wiring module according to claim 1, wherein the cover portion includes a latch portion that maintains the cover portion in a condition covering the interconnection structure.

3. The battery wiring module according to claim 1, wherein the housing includes a lock portion configured to restrict movement of the module-side terminal in the terminal housing portion, and the interconnection structure that is formed at a position corresponding to the lock portion.

4. The battery wiring module according to claim 3, wherein the cover portion includes a latch portion that maintains the cover portion in a condition covering the interconnection structure.

5. The battery wiring module according to claim 1, wherein the cover portion is formed as a single piece with the housing.

6. The battery wiring module according to claim 5, wherein the cover portion includes a latch portion that maintains the cover portion in a condition covering the interconnection structure.

7. The battery wiring module according to claim 3, wherein the lock portion and the interconnection structure are arranged at positions that overlap with a battery cell that is adjacent to a battery cell that is connected, via a bus bar, to the module-side terminal that is restricted by the lock portion from moving in a direction in which the housing and the battery cells are stacked.

8. The battery wiring module according to claim 7, wherein the cover portion includes a latch portion that maintains the cover portion in a condition covering the interconnection structure.

9. The battery wiring module according to claim 5, wherein the cover portion is integrally connected to the housing by a hinge portion.

10. The battery wiring module according to claim 9, wherein the cover portion includes a latch portion that maintains the cover portion in a condition covering the interconnection structure.

11. A battery wiring module comprising:
a module-side terminal that is configured to be electrically connected to a bus bar that connects battery terminals of a plurality of battery cells to each other,
a wire having one end that is configured to be connected to the module-side terminal, and
a housing that is configured to house the wire and the module-side terminal, wherein
the housing includes a terminal housing portion that is configured to house the module-side terminal, and an interconnecting portion that is provided on a bottom portion of the terminal housing portion and interconnects an interior region and an exterior region of the terminal housing portion,
the housing includes a lock portion configured to restrict movement of the module-side terminal in the terminal housing portion, and the interconnecting portion that is formed at a position corresponding to the lock portion,
the lock portion and the interconnecting portion are arranged at positions that overlap with a battery cell that is adjacent to a battery cell that is connected, via a bus bar, to the module-side terminal that is restricted by the lock portion from moving in a direction in which the housing and the battery cells are stacked, and
the battery wiring module further comprises a cover portion that has an insulating property and is configured to cover the interconnecting portion.

12. The battery wiring module according to claim 11, wherein the cover portion includes a latch portion that maintains the cover portion in a condition covering the interconnecting portion.

* * * * *